United States Patent
Lei et al.

(10) Patent No.: US 10,572,424 B2
(45) Date of Patent: Feb. 25, 2020

(54) METHOD AND APPARATUS FOR SWITCHING STATE

(71) Applicant: Xiaomi Inc., Beijing (CN)

(72) Inventors: Zhenfei Lei, Beijing (CN); Xiangdong Wang, Beijing (CN); Wei Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 45 days.

(21) Appl. No.: 15/384,820

(22) Filed: Dec. 20, 2016

(65) Prior Publication Data

US 2017/0177530 A1 Jun. 22, 2017

(30) Foreign Application Priority Data

Dec. 21, 2015 (CN) .......................... 2015 1 0965345

(51) Int. Cl.
*G06F 13/40* (2006.01)
*G06F 13/42* (2006.01)
(Continued)

(52) U.S. Cl.
CPC ........ *G06F 13/4022* (2013.01); *G06F 13/364* (2013.01); *G06F 13/385* (2013.01); *G06F 13/404* (2013.01); *G06F 13/4282* (2013.01)

(58) Field of Classification Search
CPC ........... G06F 13/38; G06F 13/40; G06F 13/42
See application file for complete search history.

(56) References Cited

U.S. PATENT DOCUMENTS

| 9,559,671 B1 * | 1/2017 | Jagannathan ...... H03K 17/6872 |
| 2005/0165997 A1 | 7/2005 | Sakaki et al. |

(Continued)

FOREIGN PATENT DOCUMENTS

| CN | 101359316 A | 2/2009 |
| CN | 101369259 A | 2/2009 |

(Continued)

OTHER PUBLICATIONS

International Search Report issued by the State Intellectual Property Office (SIPO) of the People's Republic of China dated Jan. 5, 2017, in PCT International Application No. PCT/CN2016/100812.

(Continued)

*Primary Examiner* — Getente A Yimer
(74) *Attorney, Agent, or Firm* — Finnegan, Henderson, Farabow, Garrett & Dunner, L.L.P.

(57) ABSTRACT

A method of switching an apparatus state of a first apparatus having a first universal serial bus (USB) interface connected via a connecting wire with a second USB interface of a second apparatus is provided. The method may include receiving a state switching instruction, setting a level of a configuration channel (CC) in a USB interface circuit corresponding to the first USB interface from a first high level to a first low level via a logic controller of the first apparatus when the state switching instruction instructs the first apparatus to perform a master-to-slave switch, and setting the level of the CC in the USB interface circuit corresponding to the first USB interface from the first low level to the first high level via the logic controller of the first apparatus when the state switching instruction instructs the first apparatus to perform a slave-to-master switch.

7 Claims, 6 Drawing Sheets

(51) Int. Cl.
*G06F 13/364* (2006.01)
*G06F 13/38* (2006.01)

(56) References Cited

U.S. PATENT DOCUMENTS

| | | | |
|---|---|---|---|
| 2005/0256987 A1* | 11/2005 | Steinle | G06F 1/24 710/110 |
| 2008/0150512 A1 | 6/2008 | Kawano | |
| 2011/0029703 A1* | 2/2011 | Huo | G06F 13/4068 710/110 |
| 2012/0231857 A1* | 9/2012 | Hsu | H04M 19/08 455/573 |
| 2012/0284441 A1* | 11/2012 | Landman | G06F 13/4295 710/110 |
| 2013/0034137 A1* | 2/2013 | Zuckerman | H04L 25/0266 375/222 |
| 2014/0365695 A1 | 12/2014 | Peng et al. | |
| 2015/0180221 A1 | 6/2015 | Leinonen et al. | |
| 2016/0188514 A1* | 6/2016 | Forghani-Zadeh | G06F 13/385 710/313 |
| 2017/0039155 A1* | 2/2017 | Feng | G06F 1/3287 |

FOREIGN PATENT DOCUMENTS

| | | |
|---|---|---|
| CN | 101989246 A | 3/2011 |
| CN | 101276316 B | 8/2013 |
| CN | 103684407 A | 3/2014 |
| CN | 105068958 A | 11/2015 |
| CN | 105224494 A | 1/2016 |
| EP | 1 739 569 A1 | 3/2007 |
| JP | 2005-209057 A | 8/2005 |
| JP | 2015-076100 A | 4/2015 |
| RU | 2355121 C2 | 5/2009 |

OTHER PUBLICATIONS

Extended European Search Report issued in corresponding European Patent Application No. 16205859.8, dated Mar. 29, 2017.
"Universal serial bus interfaces for data and power—Part 1-2: Common components—USB Power Delivery specification", IEC 62680-1-2:2016, pp. 1-470, dated Dec. 11, 2015.
Andrew Rogers, "Introduction to USB Type-C(TM)", pp. 1-20, dated Jan. 30, 2015.
English version of International Search Report dated Jan. 5, 2017, in PCT International Application No. PCT/CN2016/100812.

* cited by examiner

METHOD AND APPARATUS FOR SWITCHING STATE

CROSS-REFERENCE TO RELATED APPLICATIONS

This application is based upon and claims priority to Chinese Patent Application No. 201510965345.5, filed Dec. 21, 2015, the entire contents of which are incorporated herein by reference.

TECHNICAL FIELD

The present disclosure generally relates to the technical field of terminal, and more particularly, to a method and device for switching state.

BACKGROUND

With continuous development of USB (Universal Serial Bus) interface technology, a user may connect USB interfaces of two apparatuses by using a connecting wire, so as to achieve data interaction or electric quantity transmission between the two apparatuses.

After the two apparatuses being connected by using the connecting wire, a master apparatus of the two apparatuses may read data from and write data into a slave apparatus of the two apparatuses via the connecting wire. The slave apparatus, however, cannot read data from or write data into the master apparatus.

The method and apparatus of the present disclosure is directed towards overcoming one or more the problems set forth above.

SUMMARY

In one aspect, the present disclosure is directed to a method of switching an apparatus state of a first apparatus having a first universal serial bus (USB) interface connected via a connecting wire with a second USB interface of a second apparatus. The method may include receiving a state switching instruction, setting a level of a configuration channel (CC) in a USB interface circuit corresponding to the first USB interface from a first high level to a first low level via a logic controller of the first apparatus when the state switching instruction instructs the first apparatus to perform a master-to-slave switch, and setting the level of the CC in the USB interface circuit corresponding to the first USB interface from the first low level to the first high level via the logic controller of the first apparatus when the state switching instruction instructs the first apparatus to perform a slave-to-master switch.

In another aspect, the present disclosure is directed to an apparatus. The apparatus may include a processor connected to a pin of a logic controller, a storage component for storing instructions executable by the processor, and a first universal serial bus (USB) interface connected via a connecting wire with a second USB interface of a second apparatus. The processor may be configured to receive a state switching instruction, to set a level of a configuration channel (CC) in a USB interface circuit corresponding to the first USB interface from a first high level to a first low level via the logic controller when the state switching instruction instructs the apparatus to perform a master-to-slave switch, and to set the level of the CC in the USB interface circuit corresponding to the first USB interface from the first low level to the first high level via the logic controller when the state switching instruction instructs the apparatus to perform a slave-to-master switch.

In yet another aspect, the present disclosure is directed to a non-transitory computer-readable storage medium having stored therein instructions that, when executed by a processor of an apparatus, cause the apparatus to perform a method for switching an apparatus state. The method may include receiving a state switching instruction, setting a level of a configuration channel (CC) in a universal serial bus (USB) interface circuit from a high level to a low level via a logic controller when the state switching instruction instructs the apparatus to perform a master-to-slave switch, and setting the level of the CC in the USB interface circuit from the low level to the high level via the logic controller when the state switching instruction instructs the apparatus to perform a slave-to-master switch.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely exemplary apparatuses and methods consistent with aspects related to the invention as recited in the appended claims.

Figure 1:
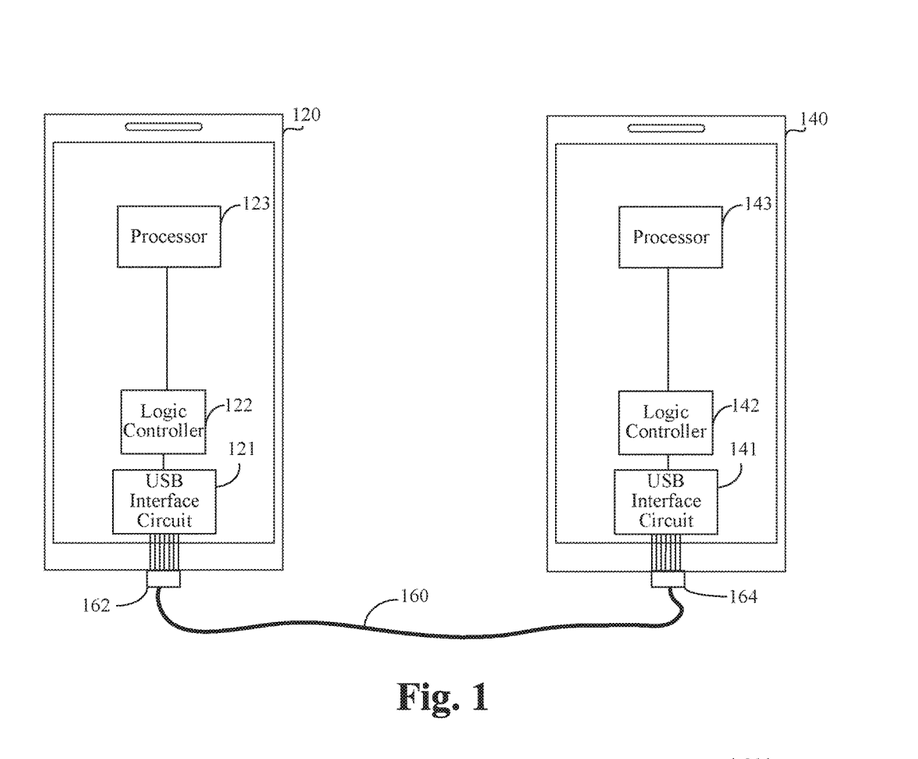
FIG. 1 illustrates a schematic diagram of an implementing environment of exemplary embodiments of the present disclosure.

FIG. 1 illustrates a schematic diagram of an implementing environment of exemplary embodiments of the present disclosure. As shown in FIG. 1, the implementing environment includes: a first apparatus 120, a second apparatus 140, and a connecting wire 160 connecting the first apparatus 120 to the second apparatus 140.

The first apparatus 120 and the second apparatus 140 may each be a smart phone, a tablet computer, an E-book reader, a MP3 (Moving Picture Experts Group Audio Layer III) player, a MP4 (Moving Picture Experts Group Audio Layer IV) player, a laptop computer, or the like. In this exemplary implementing environment shown in FIG. 1, both the first apparatus 120 and the second apparatus 140 are smart phones.

The first apparatus 120 is provided with a first USB interface, a USB interface circuit 121 corresponding to the first USB interface, and a logic controller 122 for controlling the USB interface circuit 121. The logic controller 122 is used for controlling the USB interface circuit 121 according to a control instruction issued from a processor 123. Similarly, the second apparatus 140 is provided with a second USB interface, a USB interface circuit 141 corresponding to the second USB interface, a logic controller 142 for controlling the USB interface circuit 141, and a processor 143. The first and second USB interfaces may each be a Type C interface. The USB interface circuit 121 and the USB interface circuit 141 are interface circuits corresponding to the Type C interface, and the connecting wire 160 is a Type C connecting wire. The types of the first and second USB interfaces and the type of the connecting wire of the apparatuses 120 and 140 are not limited by the present disclosure. In addition, the logic controllers 122 and 142 may be logic circuits electrically connected with the corresponding USB interface circuits 121 and 141, respectively. Upon receiving a control instruction, the logic circuit changes a level of a configuration channel (CC) in the corresponding connected USB interface circuit according to the control instruction.

When the first apparatus 120 and the second apparatus 140 are connected via the connecting wire 160, a first end 162 of the connecting wire 160 is connected with the first USB interface of the first apparatus 120, and a second end 164 of the connecting wire 160 is connected with the second USB interface of the second apparatus 140. Of the first apparatus 120 and the second apparatus 140 connected via the connecting wire 160, one apparatus is a master apparatus, and the other apparatus is a slave apparatus. The master-slave relationship between the two apparatuses 120 and 140 is generated randomly in the illustrated embodiment.

For convenience of description, in the following exemplary embodiments, both the first apparatus 120 and the second apparatus 140 are assumed to be smart phones, both the first and second USB interfaces are assumed to be Type C interfaces, and the connecting wire 160 is assumed to be a Type C connecting wire.

Figure 2:
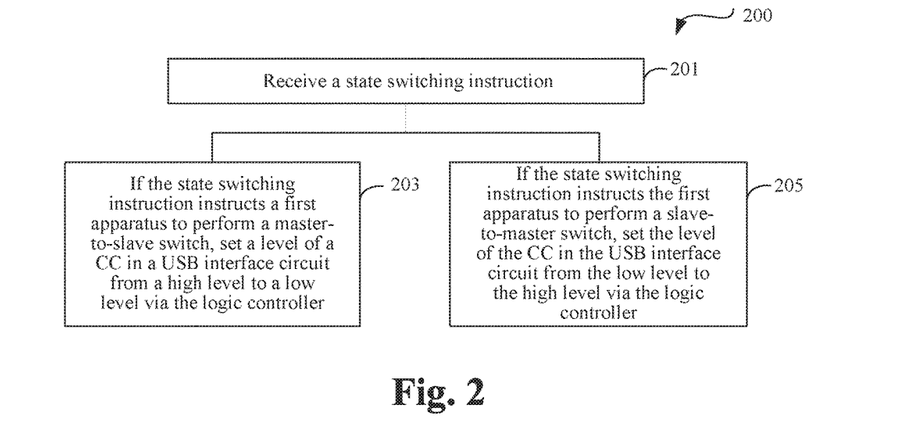
FIG. 2 is a flow chart of a method for switching state, according to an exemplary embodiment.

FIG. 2 is a flow chart of a method 200 for switching state, according to an exemplary embodiment. In this exemplary embodiment, the method 200 is applied to the first apparatus 120 in the implementing environment shown in FIG. 1. Similarly, the method 200 can also be applied to the second apparatus 140. The method 200 for switching state includes the following steps.

In step 201, a state switching instruction is received. The state switching instruction is triggered by a user for instructing the first apparatus 120 to change a present apparatus state.

In step 203, if the state switching instruction instructs the first apparatus 120 to perform a master-to-slave switch, a level of a CC in the USB interface circuit 121 is set from a high level to a low level via the logic controller 122.

In step 205, if the state switching instruction instructs the first apparatus 120 to perform a slave-to-master switch, the level of the CC in the USB interface circuit 121 is set from the low level to the high level via the logic controller 122.

The master-to-slave switch refers to switching from a master apparatus state to a slave apparatus state, and the slave-to-master switch refers to switching from a slave apparatus state to a master apparatus state. In a USB interface circuit conforming to a Type C interface protocol, two apparatuses connected via a connecting wire determine their master or slave status in the connection according to a level of a CC. For example, if the level of the CC in the USB interface circuit corresponding to one of the two apparatus is a low level, this apparatus is a slave apparatus. Accordingly, if the level of the CC in the USB interface circuit corresponding to one of the two apparatus is a high level, this apparatus is a master apparatus.

Thus, the first apparatus 120 can switch between being a master apparatus and being a slave apparatus by changing the level of the CC in the USB interface circuit 121 via the logic controller 122 according to the received state switching instruction.

In summary, according to the method 200 for switching state, after receiving a state switching instruction, a level of a CC in a USB interface circuit is changed via a corresponding logic controller according to the state switching instruction. In this way, two apparatuses connected via a connecting wire can switch between a master apparatus state and a slave apparatus state, which improves data interaction between the two apparatuses. Conventionally, limited data interaction is due to that master and slave apparatus states of two apparatus are random and cannot be switched once the two apparatuses are connected via a connecting wire. According to the method 200, master and slave apparatus states can be switched between two connected apparatuses by triggering a corresponding state switching instruction via a user, thereby improving convenience of data interaction between the two apparatuses.

Figure 3A:
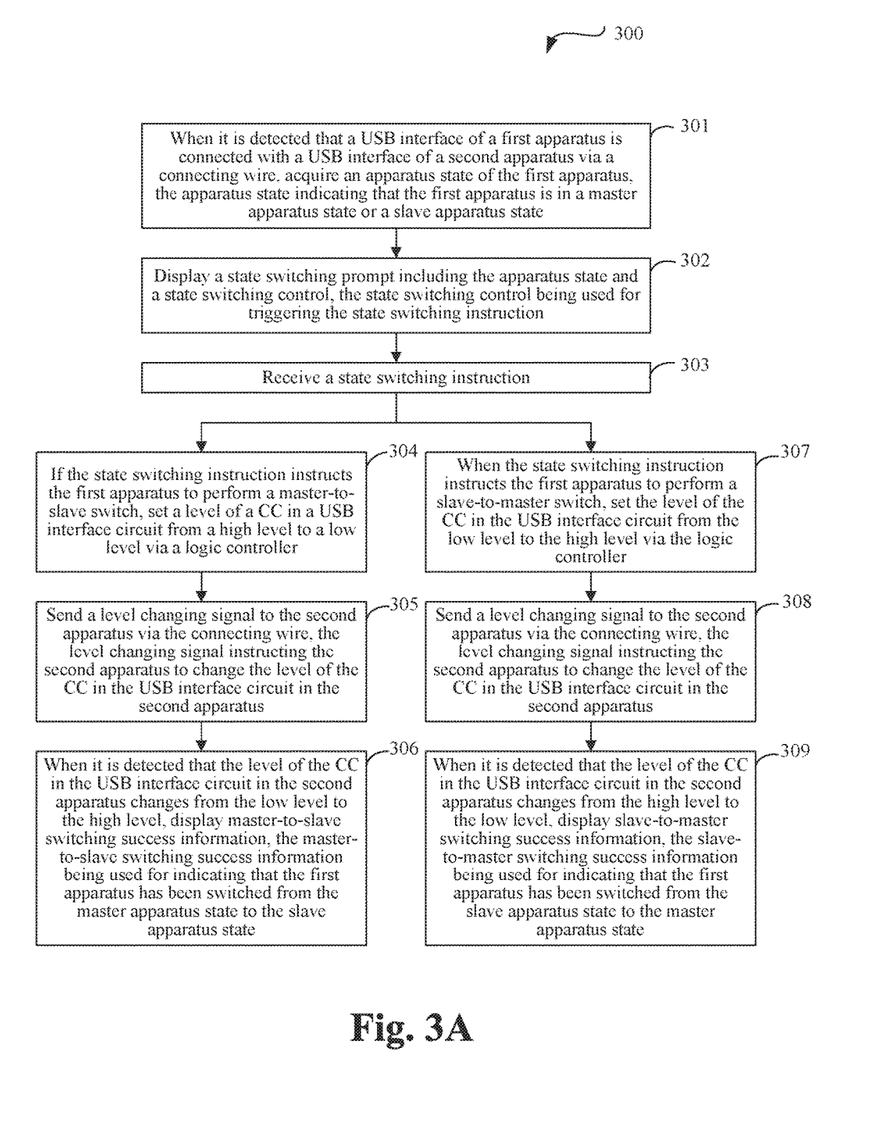
FIG. 3A is a flow chart of a method for switching state, according to another exemplary embodiment.

FIG. 3A is a flow chart of a method 300 for switching state, according to another exemplary embodiment. In this exemplary embodiment, the method 300 for switching state is applied to the first apparatus 120 in the implementing environment shown in FIG. 1. Similarly, the method 300 can also be applied to the second apparatus 140. The method 300 for switching state includes the following steps.

In step 301, when it is detected that the first USB interface of the first apparatus 120 is connected with the second USB interface of the second apparatus 140 via the connecting wire 160, an apparatus state of the first apparatus 120 is acquired. The apparatus state indicates that the first apparatus 120 is in a master apparatus state or a slave apparatus state.

When the first USB interface of the first apparatus 120 is connected with the second USB interface of the second apparatus 140 via the connecting wire 160, the processor 123 of the first apparatus 120 may identify the connected second apparatus 140 via the USB interface circuit 121. During establishing the connection, the first apparatus 120 and the second apparatus 140 may determine their corresponding apparatus states (i.e., a master apparatus state or a slave apparatus state) randomly by competition. The master apparatus (i.e., the apparatus in the master apparatus state) in the two apparatuses may read data from and write data into the slave apparatus (i.e., the apparatus in the slave apparatus state) via the connecting wire. But, the slave apparatus cannot read data from or write data into the master apparatus.

Figure 3B:
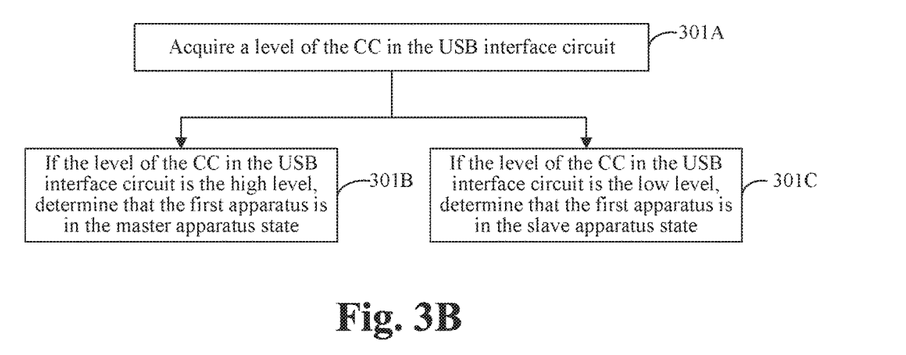
FIG. 3B is a flow chart of a method for determining an apparatus state, according to another exemplary embodiment.

In order to realize the switching of master and slave states between the two apparatuses, both the first apparatus 120 and the second apparatus 140 need to acquire their corresponding apparatus states, after establishing a connection between the first apparatus 120 and the second apparatus 140. Further, the two apparatuses need to determine which kind of switching (i.e., from a master apparatus state to a slave apparatus state, or vice versa) may be performed according to the corresponding apparatus states. FIG. 3B shows an exemplary method 300a that may be used in step 301 for determining the corresponding apparatus state of the first apparatus 120. The method 300a may include the following steps.

In step 301A, a level of the CC in the USB interface circuit 121 is acquired. Because in a USB interface conforming to a Type C interface protocol, the level of the CC in the USB interface circuit corresponding to the USB interface is used for representing an apparatus state of an apparatus in the connection. The first apparatus 120 may acquire the level of the CC in the USB interface circuit 121 via the processor 123. Accordingly, the processor 143 of the second apparatus 140 may, after detecting that the connection with the first apparatus 120 is established, acquire the level of the CC in the USB interface circuit 141.

In step 301B, if the level of the CC in the USB interface circuit 121 is a high level, it is determined that the first apparatus 120 is in a master apparatus state. Accordingly, when the first apparatus 120 is in the master apparatus state currently, the level of the CC in the USB interface circuit 141 acquired by the second apparatus 140 should be a low level, i.e., the second apparatus 140 is in a slave apparatus state currently.

In step 301C, if the level of the CC in the USB interface circuit 121 is a low level, it is determined that the first apparatus 120 is in a slave apparatus state. Accordingly, when the first apparatus 120 is determined to be in the slave apparatus state currently, the second apparatus 140 is determined to be in a master apparatus state currently.

Referring back to FIG. 3A, in step 302, a state switching prompt is displayed. The state switching prompt includes at least the apparatus state of the first apparatus 120 and a state switching control. The state switching control is used for triggering a state switching instruction.

To assist a user to know the apparatus states of the first apparatus 120 and the second apparatus 140, and to accordingly switch the apparatus states of the two apparatuses if desired, the first apparatus 120, after determining its current apparatus state, displays the current apparatus state, and also provides a corresponding state switching control to the user for triggering the state switching instruction.

For example, after connecting the first and second apparatuses 120 and 140, the first apparatus 120 pops out a prompt box which includes the current apparatus state of the first apparatus 120 and the state switching control. The state switching control may be displayed as a button. Correspondingly, the second apparatus 140 may also pop out a corresponding prompt box for displaying the current apparatus state of the second apparatus 140 and the state switching control. Alternatively, the first and second apparatuses may also be installed with corresponding master-slave state switching software. After establishing a connection of the first and second apparatuses, the master-slave state switching software is automatically started, and a corresponding apparatus state and a state switching control are displayed in a software interface.

Figure 3C:
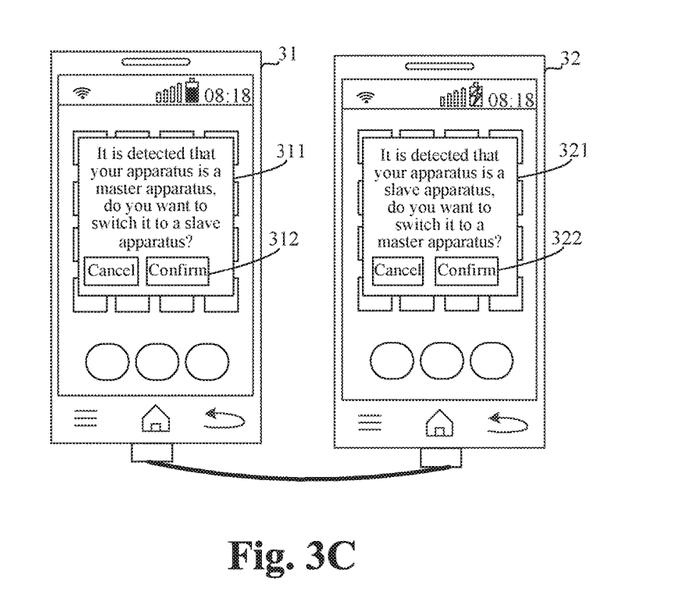
FIGS. 3C and 3D are schematic diagrams of implementing a method for switching state, according to another exemplary embodiment.

FIG. 3C shows an exemplary state switching prompt box that may be used in step 302. As shown in FIG. 3C, after connecting a first apparatus 31 and a second apparatus 32 via a connecting wire, the first apparatus 31 displays a state switching prompt box 311 which contains a current apparatus state of the first apparatus 31 and a state switching button 312; and the second apparatus 32 displays a state switching prompt box 321 which contains a current apparatus state of the second apparatus 32 and a state switching button 322.

Referring back to FIG. 3A, in step 303, a state switching instruction is received. When the user needs to change the current apparatus state of the first apparatus 120, the user may trigger the state switching instruction corresponding to the current apparatus state via the state switching control in the state switching prompt box. An exemplary relationship between a state switching instruction and an apparatus state may be illustratively shown as Table 1 below. Accordingly, the first apparatus 120 receives the state switching instruction.

TABLE 1

Exemplary relationship between state switching instruction and apparatus state

| Apparatus State | State Switching Instruction |
| --- | --- |
| Master apparatus state | Master-to-slave switching instruction |
| Slave apparatus state | Slave-to-master switching instruction |

In step 304, if the state switching instruction indicates the first apparatus 120 to perform a master-to-slave switch, the level of the CC in the USB interface circuit 121 is set from a high level to a low level via the logic controller 122.

When the first apparatus 120 is in the master apparatus state, the state switching control is used for triggering the master-to-slave switching instruction. Correspondingly, the processor 123 in the first apparatus 120, after receiving the master-to-slave switching instruction, knows that it needs to switch the apparatus state to the slave apparatus state. The processor 123 sends a control instruction to the logic controller 122 for controlling the USB interface circuit 121. After receiving the control instruction, the logic controller 122 sets the level of the CC in the USB interface circuit 121 from the high level to the low level.

In step 305, a level changing signal is sent to the second apparatus 140 via the connecting wire 160. The level changing signal is used to notify the second apparatus 140 to change the level of the CC in the USB interface circuit 141.

When the first apparatus 120 changes its apparatus state, the second apparatus 140 also needs to switch its apparatus state. For example, the first apparatus 120 may send the level changing signal to the second apparatus 140 via the connecting wire 160. After receiving the level changing signal, the second apparatus 140 sends a control instruction to the logic controller 142 via the processor 143, for instructing the logic controller 142 to change the level of the CC in the USB interface circuit 141.

Alternatively, the processor 143 in the second apparatus 140 may also monitor the level of the CC in the USB interface circuit 121 of the first apparatus 120 via the connecting wire 160 in real time, and automatically change the level of the CC in its USB interface circuit 141 when the second apparatus 140 detects that the level of the CC in the USB interface circuit 121 of the first apparatus 120 changes. It is contemplated that other means may also be implemented.

In step 306, when it is detected that the level of the CC in the USB interface circuit 141 in the second apparatus 140 changes from the low level to the high level, information indicating a successful master-to-slave switching is displayed. The information is used to indicate that the first apparatus 120 has been switched from the master apparatus state to the slave apparatus state.

The processor 123 of the first apparatus 120 via the connecting wire 160 monitors whether the level of the CC in the USB interface circuit 141 in the second apparatus 140 changes. The processor 123 further displays the information of successful master-to-slave switching when the level of the CC in the first apparatus 120 changes from the high level to the low level and the level of the CC in the second apparatus 140 changes from the low level to the high level. Further, the user is notified that the first apparatus 120 has been switched from the master apparatus to the slave apparatus, and the second apparatus 140 has been switched from the slave apparatus to the master apparatus.

Figure 3D:
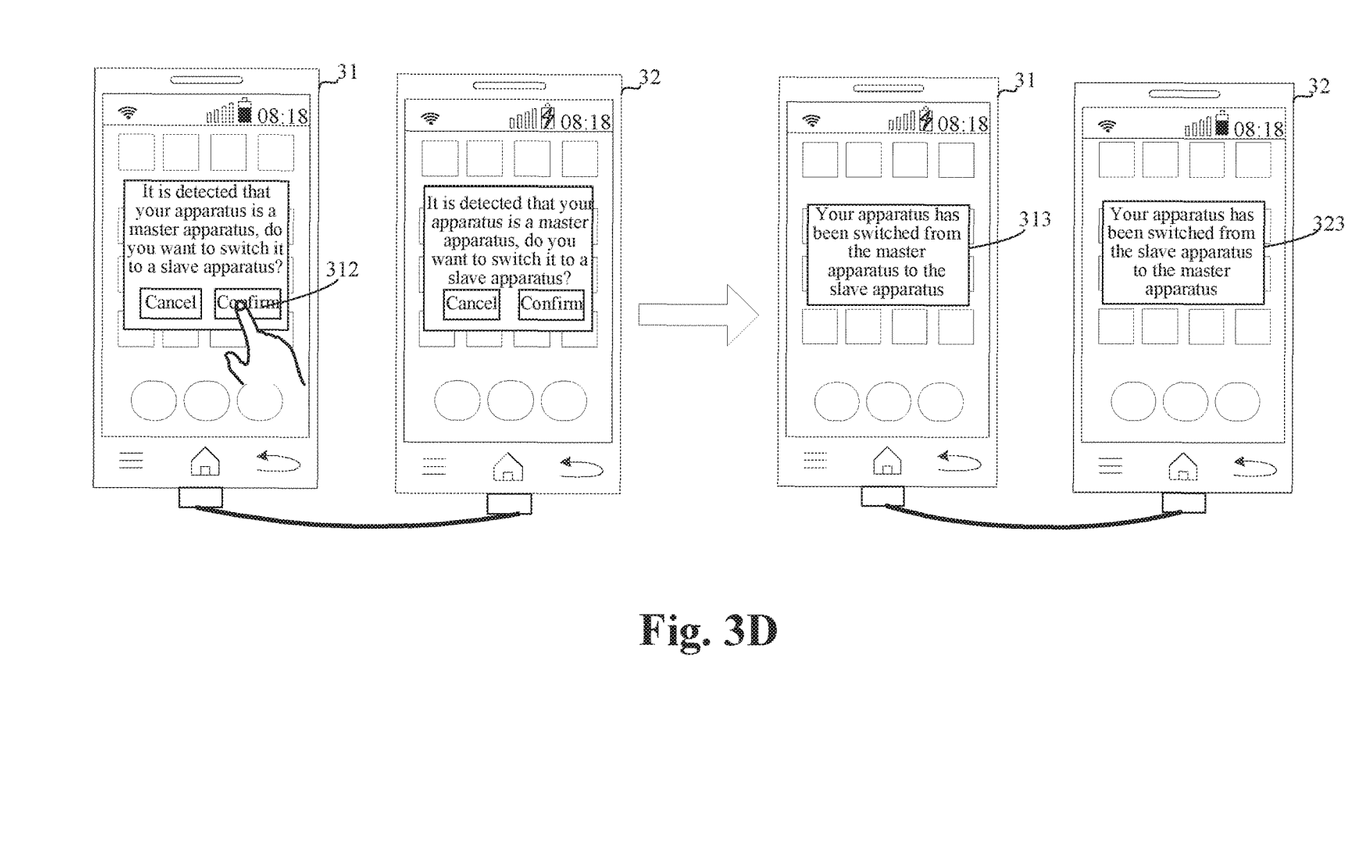

For example, as shown in FIG. 3D, the user switches the apparatus states of the first apparatus 31 by clicking a state switching button 312 displayed in the first apparatus 31. After the completion of the switching of the apparatus states, the first apparatus 31 and the second apparatus 32 display the corresponding switching success information 313 and switching success information 323, respectively.

Before the state switching, the first apparatus 120 as the master apparatus may read data from and write data into the second apparatus 140 as the slave apparatus. After the state switching, the second apparatus 140 as the master apparatus may read data from and write data into the first apparatus 120 as the slave apparatus. During the state switching, the user only needs to operate the state switching control, thus, the state switching process is simple and quick.

To facilitate switching the apparatus state during the connection between the first and second apparatuses, the state switching control may be provided in a dropdown menu. When the user needs to switch the apparatus state, the user only needs to click the state switching control in the dropdown menu.

In step 307, when the state switching instruction instructs the first apparatus 120 to perform a slave-to-master switch, the level of the CC in the USB interface circuit 121 is set from the low level to the high level via the logic controller 122.

When the first apparatus 120 is in the slave apparatus state, the state switching control is used for triggering the slave-to-master switching instruction. Correspondingly, the processor 123 in the first apparatus 120, after receiving the slave-to-master switching instruction, knows that it needs to switch the apparatus state to the master apparatus state. The processor 123 sends a control instruction to the logic controller 122 for controlling the USB interface circuit 121. After receiving the control instruction, the logic controller 122 sets the level of the CC in the USB interface circuit 121 from the low level to the high level.

In step 308, a level changing signal is sent to the second apparatus 140 via the connecting wire 160, the level changing signal is used to notify the second apparatus 140 to change the level of the CC in the USB interface circuit 141 in the second apparatus 140.

When the first apparatus 120 changes its apparatus state, the second apparatus 140 also needs to switch its apparatus state. For example, the first apparatus 120 may send the level changing signal to the second apparatus 140 via the connecting wire 160. After receiving the level changing signal, the second apparatus 140 sends a control instruction to the logic controller 142 via the processor 143, for indicating the logic controller 142 to change the level of the CC in the USB interface circuit 141.

In step 309, when it is detected that the level of the CC in the USB interface circuit 141 in the second apparatus 140 changes from the high level to the low level, information of successful slave-to-master switching is displayed. The information is used for indicating that the first apparatus 120 has been switched from the slave apparatus state to the master apparatus state.

The processor 123 of the first apparatus 120 via the connecting wire monitors whether the level of the CC in the USB interface circuit 141 in the second apparatus 140 changes. The processor 123 further displays the slave-to-master switching success information when the level of the CC in the first apparatus 120 changes from the low level to the high level and the level of the CC in the second apparatus 140 changes from the high level to the low level. The user is notified that the first apparatus 120 has been switched from the slave apparatus to the master apparatus, and the second apparatus 140 has been switched from the master apparatus to the slave apparatus.

According the method 200 for switching state, after receiving a state switching instruction, a level of a CC in a USB interface circuit is changed via a logic controller according to the state switching instruction. In this way, two apparatuses connected via a connecting wire can switch between a master apparatus state and a slave apparatus state, which improves data interaction between the two apparatuses. Conventionally, limited data interaction is due to that master and slave apparatus states of two apparatus are random and cannot be switched once the two apparatuses are connected via a connecting wire. According the method 200, the master and slave states can be switched between two connected apparatuses by triggering a corresponding state switching instruction via a user, thereby improving convenience of data interaction between the apparatuses.

In the above exemplary embodiments, after being connected with the second apparatus via the connecting wire, the first apparatus displays the current apparatus state of the first apparatus and a corresponding state switching control. When the user triggers the state switching control, the first apparatus performs the switching of the master and slave states. The entire state switching is simple and quick, and the efficiency of state switching can be greatly improved.

In the exemplary embodiment, while the first apparatus switches its apparatus state, the second apparatus changes its apparatus state accordingly based on the switching condition of the first apparatus. Information of successful switching is displayed when both the apparatus states of the first and second apparatuses change. Thus, the user is also prompted that the state switching is successful. In this way, the entire switching procedure is more intuitive, and the user's operation is facilitated.

Figure 4:
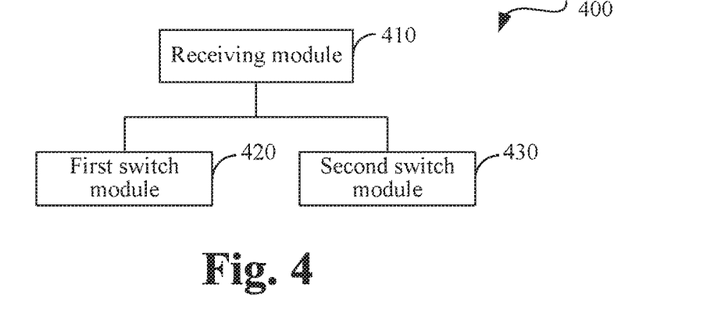
FIG. 4 is a block diagram of an apparatus for switching state, according to an exemplary embodiment.

FIG. 4 is a block diagram of an apparatus 400 for switching state, according to an exemplary embodiment. The apparatus 400 may be used in the first apparatus 120 in FIG. 1. The apparatus 400 may be implemented as hardware, software, or a combination of hardware and software. The apparatus 400 may include a receiving module 410, a first switch module 420, and a second switch module 430.

The receiving module 410 is configured to receive a state switching instruction. The first switch module 420 is configured to, when the state switching instruction indicates a first apparatus to perform a master-to-slave switch, set a level of a CC in a USB interface circuit of the first apparatus from a high level to a low level via a logic controller of the first apparatus. The second switch module 430 is configured to, when the state switching instruction indicates the first apparatus to perform a slave-to-master switch, set the level of the CC in the USB interface circuit of the first apparatus from the low level to the high level via the logic controller of the first apparatus.

In the apparatus 400, after receiving the state switching instruction, the level of the CC in the USB interface circuit is changed via the logic controller according to the state switching instruction, such that the switching of master state and slave state between two connected apparatuses may be realized, which improves data interaction between the two apparatuses. Conventionally, limited data interaction is due to that the master and slave states are random and cannot be switched after the two apparatuses are connected via a connecting wire. According to the apparatus 400, the master and slave states can be switched between two connected apparatuses by triggering a corresponding state switching instruction via a user, thereby improving convenience of data interaction between the two apparatuses.

Figure 5:
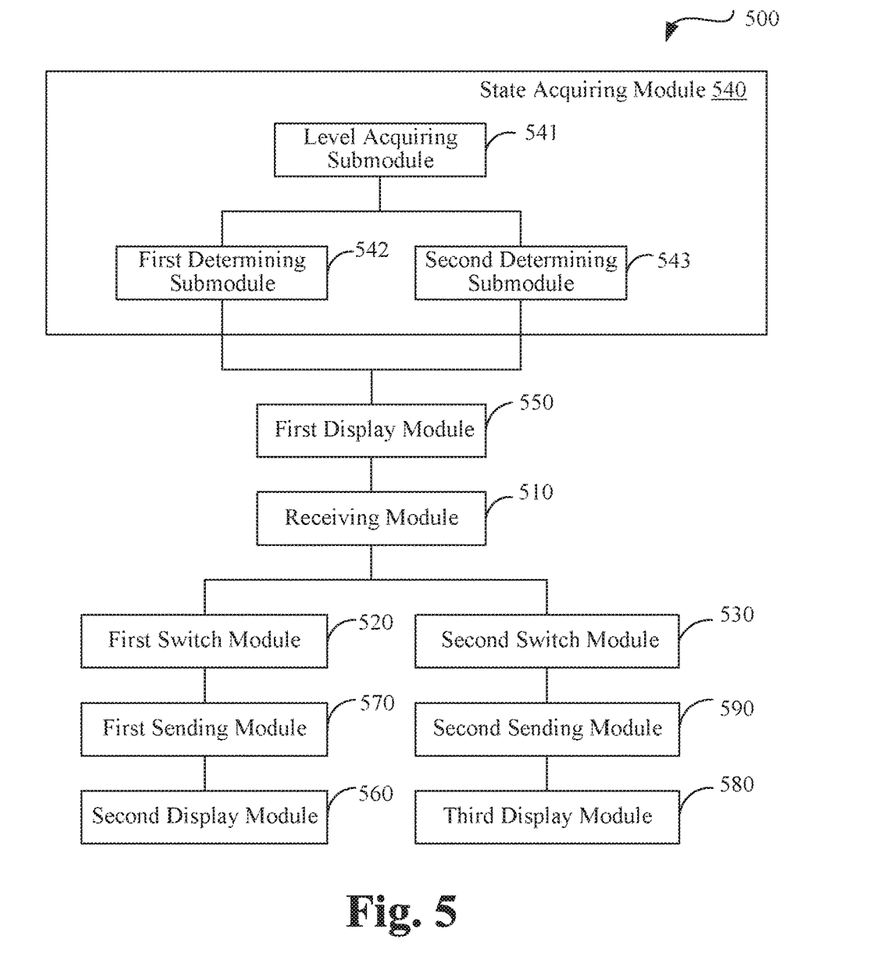
FIG. 5 is a block diagram of an apparatus for switching state, according to another exemplary embodiment.

FIG. 5 is a block diagram of an apparatus 500 for switching state, according to another exemplary embodiment. The apparatus 500 may be used in the first apparatus 120 in FIG. 1. The apparatus 500 may be implemented as hardware, software, or a combination of hardware and software. The apparatus 500 may include a receiving module 510, a first switch module 520, and a second switch module 530.

The receiving module 510 is configured to receive a state switching instruction. The first switch module 520 is configured to, when the state switching instruction indicates a first apparatus to perform a master-to-slave switch, set a level of a CC in a USB interface circuit of the first apparatus from a high level to a low level via a logic controller of the first apparatus. The second switch module 530 is configured to, when the state switching instruction indicates the first apparatus to perform a slave-to-master switch, set the level of the CC in the USB interface circuit of the first apparatus from the low level to the high level via the logic controller of the first apparatus.

In some embodiments, the apparatus 500 may further include a state acquiring module 540, and a first display module 550.

The state acquiring module 540 is configured to, when it is detected that a USB interface of the first apparatus is connected with a USB interface of a second apparatus via a connecting wire, acquire an apparatus state of the first apparatus. The apparatus state indicates that the first apparatus is in a master apparatus state or a slave apparatus state.

The first display module 550 is configured to display a state switching prompt box containing at least the apparatus state and a state switching control. The state switching control is used for triggering a state switching instruction.

In some embodiments, the state acquiring module 540 may include a level acquiring submodule 541, a first determining submodule 542, and a second determining submodule 543.

The level acquiring submodule 541 is configured to acquire a level of the CC in the USB interface circuit of the first apparatus. The first determining submodule 542 is configured to, when the level of the CC in the USB interface circuit of the first apparatus is the high level, determine that the first apparatus is in the master apparatus state. The second determining submodule 543 is configured to, when the level of the CC in the USB interface circuit of the first apparatus is the low level, determine that the first apparatus is in the slave apparatus state.

In some embodiments, the apparatus 500 may further include: a first sending module 570, and a second display module 560.

The first sending module 570 is configured to send a level changing signal to the second apparatus via the connecting wire. The level changing signal is used for instructing the second apparatus to change the level of the CC in the USB interface circuit of the second apparatus.

The second display module 560 is configured to, when it is detected that the level of the CC in the USB interface circuit of the second apparatus changes from the low level to the high level, display master-to-slave switching success information. The master-to-slave switching success information is used for indicating that the first apparatus has been switched from the master apparatus state to the slave apparatus state.

In some embodiments, the apparatus 500 may further include a second sending module 590, and a third display module 580.

The second sending module 590 is configured to, send a level changing signal to the second apparatus via the connecting wire. The level changing signal is used for instructing the second apparatus to change the level of the CC in the USB interface circuit in the second apparatus.

The third display module 580 is configured to, when it is detected that the level of the CC in the USB interface circuit in the second apparatus changes from the high level to the low level, display slave-to-master switching success information. The slave-to-master switching success information is used for indicating that the first apparatus has been switched from the slave apparatus state to the master apparatus state.

In some embodiments, the USB interface circuits of the first and second apparatus are each an interface circuit corresponding to a Type C interface.

In the apparatus 500, after receiving the state switching instruction, the level of the CC in the USB interface circuit is changed via the logic controller according to the state switching instruction, such that the switching of master state and slave state between the two apparatuses is realized, which improves data interaction between the two apparatuses. Conventionally, limited data interaction is due to that the master and slave states are random and cannot be switched after the two apparatuses are connected via the connecting wire. According to the apparatus 500, the master and slave states can be switched between two connected apparatuses by triggering a corresponding state switching instruction via a user, thereby improving convenience of data interaction between the two apparatuses.

In the above exemplary embodiment, after being connected with the second apparatus via the connecting wire, the first apparatus displays the current apparatus state of the first apparatus and a corresponding state switching control. When the user triggers the state switching control, the first apparatus performs the switching of master and slave states. The state switching procedure is simple and quick, and the efficiency of state switching can be greatly improved.

In the above exemplary embodiment, while the first apparatus switches its apparatus state, the second apparatus changes its apparatus state accordingly based on the switching condition of the first apparatus. Switching success information is displayed when both the apparatus states of the first and second apparatuses change, to prompt the user that the state switching is successful. In this way, the entire switching procedure is more intuitive, and the user's operation is facilitated.

Figure 6:
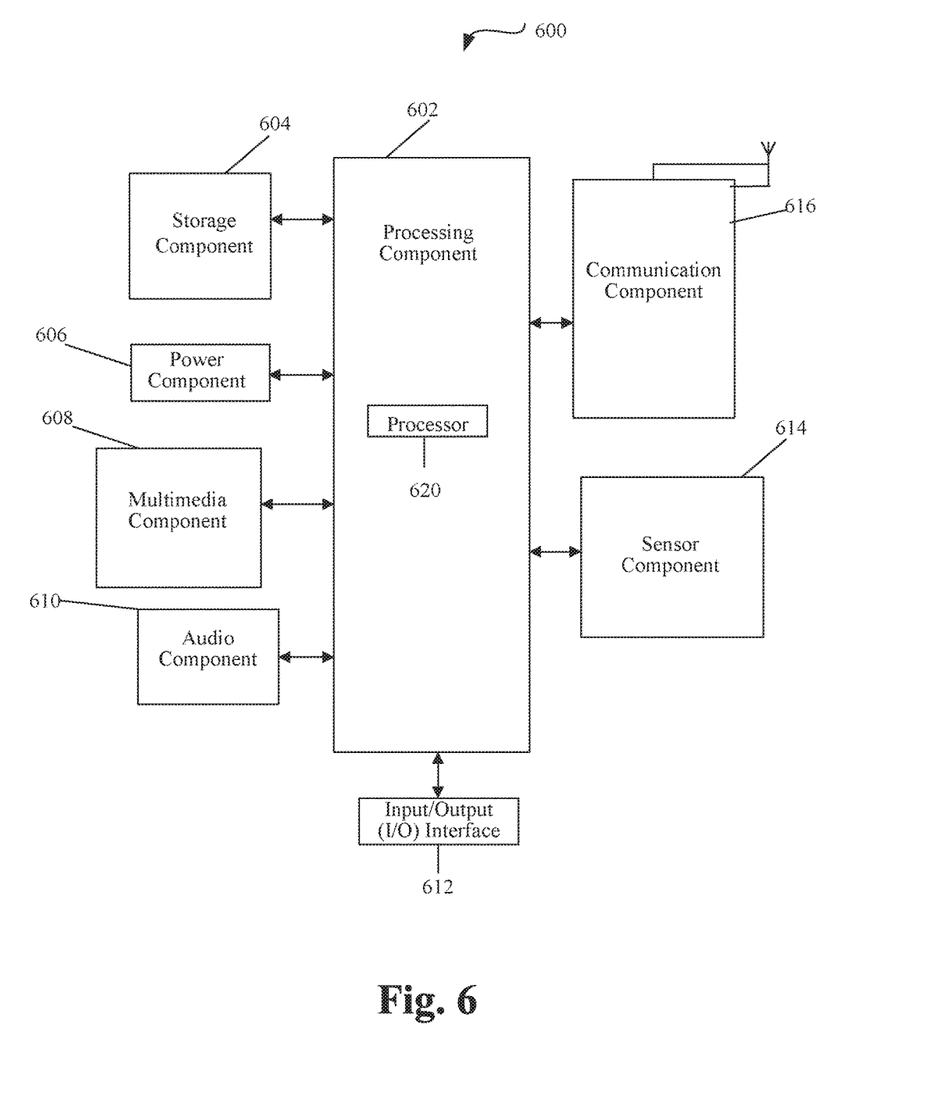
FIG. 6 is a block diagram of an apparatus for switching state, according to yet another exemplary embodiment.

FIG. 6 is a block diagram of an apparatus 600 for switching state, according to an exemplary embodiment. For example, the apparatus 600 may be an electronic device provided with a USB interface, such as a smart phone, a tablet computer, or an E-book reader.

Referring to FIG. 6, the apparatus 600 may include one or more of the following components: a processing component 602, a storage component 604, a power component 606, a multimedia component 608, an audio component 610, an input/output (I/O) interface 612, a sensor component 614, and a communication component 616.

The processing component 602 typically controls overall operations of the apparatus 600, such as operations associated with display, telephone calls, data communications, camera operations, and recording operations. The processing component 602 may include one or more processors 620 to execute instructions to perform all or part of the steps in the above described methods. Moreover, the processing component 602 may include one or more modules that facilitate interactions between the processing component 602 and other components. For instance, the processing component 602 may include a multimedia module to facilitate interactions between the multimedia component 608 and the processing component 602. In this exemplary embodiment, the processor 620 is connected with a control pin of an IC in a USB interface circuit for receiving a state switching request, and for sending a corresponding state switching signal to the IC in the USB interface circuit via the control pin according to the state switching request.

The storage component 604 is configured to store various types of data to support operation of the apparatus 600. Examples of such data include instructions for any applications or methods operated on the apparatus 600, contact data, phonebook data, messages, pictures, video, etc. The storage component 604 may include any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic storage device, a flash memory, a magnetic or optical disk.

The power component 606 provides power to various components of the apparatus 600. The power component 606 may include a power management system, one or more power sources, and/or any other components associated with generation, management, and distribution of power in the apparatus 600. In this exemplary present embodiment, the power component 606 is electronically connected with a PMIC in the USB interface circuit.

The multimedia component 608 may include a screen providing an output interface between the apparatus 600 and a user. In some embodiments, the screen may include a liquid crystal display (LCD) and a touch panel (TP). If the screen includes the touch panel, the screen may be implemented as a touch screen to receive input signals from the user. The touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 may include a front camera and/or a rear camera. The front camera and/or the rear camera may receive an external multimedia datum while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 may include a microphone (MIC) configured to receive an external audio signal when the apparatus 600 is in an operation mode, such as a call mode, a recording mode, or a voice recognition mode. The received audio signal may be further stored in the storage component 604 or transmitted via the communication component 616. In some embodiments, the audio component 610 may further include a speaker to output audio signals.

The I/O interface 612 provides an interface between the processing component 602 and peripheral interface modules. The peripheral interface modules may include a keyboard, a click wheel, buttons, and the like. The buttons may include, but are not limited to, a home button, a volume button, a starting button, and a locking button. In the present embodiment, the I/O interface 612 may be a USB interface.

The sensor component 614 may include one or more sensors to provide status assessments of various aspects of the apparatus 600. For instance, the sensor component 614 may detect an open/closed status of the apparatus 600, relative positioning of components (e.g., the display and the keypad) of the apparatus 600, a change in position of the apparatus 600 or a component of the apparatus 600, a presence or absence of user contact with the apparatus 600, an orientation or an acceleration/deceleration of the apparatus 600, and/or a change in temperature of the apparatus 600. The sensor component 614 may further include a proximity sensor configured to detect the presence of nearby objects without any physical contact. The sensor component 614 may also include a light sensor, such as a CMOS or CCD image sensor, for imaging applications. In some embodiments, the sensor component 614 may also include an accelerometer sensor, a gyroscope sensor, a magnetic sensor, a pressure sensor, or a temperature sensor.

The communication component 616 is configured to facilitate wired or wireless communications between the apparatus 600 and other devices. The apparatus 600 can access a wireless network based on a communication standard, such as WiFi, 2G, or 3G, or a combination thereof. In one exemplary embodiment, the communication component 616 may receive broadcast signals from an external broadcast management system or broadcast associated information via a broadcast channel. In one exemplary embodiment, the communication component 616 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In some embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium having instructions stored thereon is provided, such as the storage component 604 with instructions stored thereon. The above instructions are executable by the processor 620 in the apparatus 600, for performing the above-described methods. For example, the non-transitory computer-readable storage medium may be a ROM, a RAM, a CD-ROM, a magnetic tape, a floppy disc, an optical data storage device, and the like.

In addition, the instructions stored on the non-transitory computer readable storage medium, when executed by the processor of the apparatus 600, may cause the apparatus 600 to perform the above described method for switching state.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method of switching an apparatus state of a first apparatus having a first universal serial bus (USB) interface connected via a connecting wire with a second USB interface of a second apparatus, comprising:
    acquiring an apparatus state of the first apparatus, when the first USB interface is detected to be connected with the second USB interface via the connecting wire, wherein the apparatus state indicates that the first apparatus is in a master apparatus state or a slave apparatus state;
    displaying a state switching prompt including at least the apparatus state and a state switching control, wherein the state switching control is used for triggering the state switching instruction;
    receiving a state switching instruction;
    setting a level of a configuration channel (CC) in a USB interface circuit corresponding to the first USB interface from a first high level to a first low level via a logic controller of the first apparatus, when the state switching instruction instructs the first apparatus to perform a master-to-slave switch;
    setting the level of the CC in the USB interface circuit corresponding to the first USB interface from the first low level to the first high level via the logic controller of the first apparatus, when the state switching instruction instructs the first apparatus to perform a slave-to-master switch;
    sending a level changing signal to the second apparatus via the connecting wire, the level changing signal instructing the second apparatus to change a level of a CC in a USB interface circuit corresponding to the second USB interface; and
    displaying master-to-slave switching success information, when the level of the CC in the USB interface circuit corresponding to the second USB interface changes from a second low level to a second high level, wherein the master-to-slave switching success information is used for indicating that the first apparatus has been switched from the master apparatus state to the slave apparatus state, or displaying slave-to-master switching success information, when the level of the CC in the USB interface circuit corresponding to the second USB interface changes from a second high level to a second low level, wherein the slave-to-master switching success information is used for indicating that the first apparatus has been switched from the slave apparatus state to the master apparatus state.

2. The method of claim 1, wherein the acquiring the apparatus state of the first apparatus includes:
    acquiring the level of the CC in the USB interface circuit corresponding to the first USB interface;
    determining that the first apparatus is in the master apparatus state, when the acquired level of the CC is the first high level; and
    determining that the first apparatus is in the slave apparatus state, when the acquired level of the CC is the first low level.

3. The method of claim 1, wherein the USB interface circuit corresponding to the first USB interface is an interface circuit corresponding to a type C interface.

4. An apparatus, comprising:
    a processor connected to a pin of a logic controller;
    a storage component for storing instructions executable by the processor; and
    a first universal serial bus (USB) interface connected via a connecting wire with a second USB interface of a second apparatus,
    wherein the processor is configured to:
        acquire an apparatus state of the apparatus, when the first USB interface is detected to be connected with the second USB interface of the second apparatus via the connecting wire, wherein the apparatus state indicates that the apparatus is in a master apparatus state or a slave apparatus state;
        display a state switching prompt including at least the apparatus state and a state switching control, wherein the state switching control is used for triggering the state switching instruction;
        receive a state switching instruction;
        set a level of a configuration channel (CC) in a USB interface circuit corresponding to the first USB interface from a first high level to a first low level via the logic controller, when the state switching instruction instructs the apparatus to perform a master-to-slave switch;
        set the level of the CC in the USB interface circuit corresponding to the first USB interface from the first low level to the first high level via the logic controller, when the state switching instruction instructs the apparatus to perform a slave-to-master switch;
        send a level changing signal to the second apparatus via the connecting wire, the level changing signal instructing the second apparatus to change a level of a CC in a USB interface circuit corresponding to the second USB interface;
        display master-to-slave switching success information, when the level of the CC in the USB interface circuit corresponding to the second USB interface changes from a second low level to a second high level, wherein the master-to-slave switching success information is used for indicating that the apparatus has been switched from the master apparatus state to the slave apparatus state, or display slave-to-master switching success information, when the level of the CC in the USB interface circuit corresponding to the second USB interface changes from a second high level to a second low level, wherein the slave-to-master switching success information is used for indicating that the apparatus has been switched from the slave apparatus state to the master apparatus state.

5. The apparatus of claim 4, wherein the processor is further configured to:
acquire the level of the CC in the USB interface circuit corresponding to the first USB interface;
determine that the apparatus is in the master apparatus state, when the acquired level of the CC in the USB interface circuit is the first high level; and
determine that the apparatus is in the slave apparatus state, when the acquired level of the CC in the USB interface circuit is the first low level.

6. The apparatus of claim 4, wherein the USB interface circuit corresponding to the first USB interface is an interface circuit corresponding to a type C interface.

7. A non-transitory computer-readable storage medium having stored therein instructions that, when executed by a processor of an apparatus, cause the apparatus to perform a method for switching an apparatus state, the method comprising:
acquiring an apparatus state of the first apparatus, when the first USB interface is detected to be connected with the second USB interface via the connecting wire, wherein the apparatus state indicates that the first apparatus is in a master apparatus state or a slave apparatus state;
displaying a state switching prompt including at least the apparatus state and a state switching control, wherein the state switching control is used for triggering the state switching instruction;
receiving a state switching instruction;
setting a level of a configuration channel (CC) in a universal serial bus (USB) interface circuit from a high level to a low level via a logic controller, when the state switching instruction instructs the apparatus to perform a master-to-slave switch;
setting the level of the CC in the USB interface circuit from the low level to the high level via the logic controller, when the state switching instruction instructs the apparatus to perform a slave-to-master switch;
sending a level changing signal to the second apparatus via the connecting wire, the level changing signal instructing the second apparatus to change a level of a CC in a USB interface circuit corresponding to the second USB interface;
displaying master-to-slave switching success information, when the level of the CC in the USB interface circuit corresponding to the second USB interface changes from a second low level to a second high level, wherein the master-to-slave switching success information is used for indicating that the first apparatus has been switched from the master apparatus state to the slave apparatus state, or displaying slave-to-master switching success information, when the level of the CC in the USB interface circuit corresponding to the second USB interface changes from a second high level to a second low level, wherein the slave-to-master switching success information is used for indicating that the first apparatus has been switched from the slave apparatus state to the master apparatus state.

* * * * *